US006669092B2

(12) United States Patent
Leanheart et al.

(10) Patent No.: US 6,669,092 B2
(45) Date of Patent: Dec. 30, 2003

(54) DISPLAY APPARATUS

(75) Inventors: Stephen J. Leanheart, Ellicott City, MD (US); Joshua I. Feldstein, Silver Spring, MD (US); Richard P. Meyst, Valley Center, CA (US); Steven G. Yoder, San Jose, CA (US)

(73) Assignee: SensoryScapes, Inc., Bethel, CT (US)

(*) Notice: Subject to any disclaimer, the term of this patent is extended or adjusted under 35 U.S.C. 154(b) by 49 days.

(21) Appl. No.: 09/924,598

(22) Filed: Aug. 9, 2001

(65) Prior Publication Data

US 2003/0029918 A1 Feb. 13, 2003

(51) Int. Cl.[7] .............................................. G06K 15/00
(52) U.S. Cl. ............................ 235/462.13; 235/462.05; 235/462.15; 235/462.43
(58) Field of Search ........................... 340/572.1, 572.7; 40/428, 427; 235/383, 472.01, 462.13

(56) References Cited

U.S. PATENT DOCUMENTS

| | | | | |
|---|---|---|---|---|
| 3,415,571 A | | 12/1968 | Heimert, III | |
| 3,950,086 A | | 4/1976 | Schulman et al. | |
| 4,260,376 A | | 4/1981 | Litel et al. | |
| 4,629,604 A | | 12/1986 | Spector | |
| 4,763,428 A | | 8/1988 | Fischer | |
| 4,893,615 A | | 1/1990 | Khabirova | |
| 4,901,141 A | | 2/1990 | Costello | |
| 5,069,876 A | | 12/1991 | Oshinsky | |
| 5,195,820 A | * | 3/1993 | Rehberg | 126/523 |
| 5,426,879 A | | 6/1995 | Hecker | |
| 5,565,148 A | | 10/1996 | Pendergrass, Jr. | |
| 5,594,802 A | * | 1/1997 | Berghoff et al. | 381/61 |
| 5,608,980 A | | 3/1997 | Pangerl | |
| 5,642,580 A | * | 7/1997 | Hess et al. | 40/428 |
| 5,681,259 A | | 10/1997 | August | |
| 5,807,114 A | | 9/1998 | Hodges et al. | |
| 5,949,522 A | | 9/1999 | Manne | |
| 5,999,105 A | | 12/1999 | Gordon | |
| 6,012,926 A | | 1/2000 | Hodges et al. | |
| 6,107,920 A | | 8/2000 | Eberhardt et al. | |
| 6,254,527 B1 | | 7/2001 | August | |
| 6,429,776 B1 | * | 8/2002 | Alicot et al. | 340/572.1 |

FOREIGN PATENT DOCUMENTS

| | | |
|---|---|---|
| CA | 1044016 | 12/1978 |
| GB | 2253732 | 9/1992 |

* cited by examiner

*Primary Examiner*—Michael G. Lee
*Assistant Examiner*—Kumiko C. Koyama
(74) *Attorney, Agent, or Firm*—Stephen R. Greiner

(57) ABSTRACT

A display apparatus including a light box upon which a display piece can be removably positioned and illuminated from behind. The display piece carries a machine-readable tag from which a tag reader in the light box may obtain identifying information. A central processing unit in the light box selectively energizes a digital audio player and an aroma diffuser in response to the identifying information obtained from the machine-readable tag by the tag reader.

19 Claims, 3 Drawing Sheets

FIG. 3
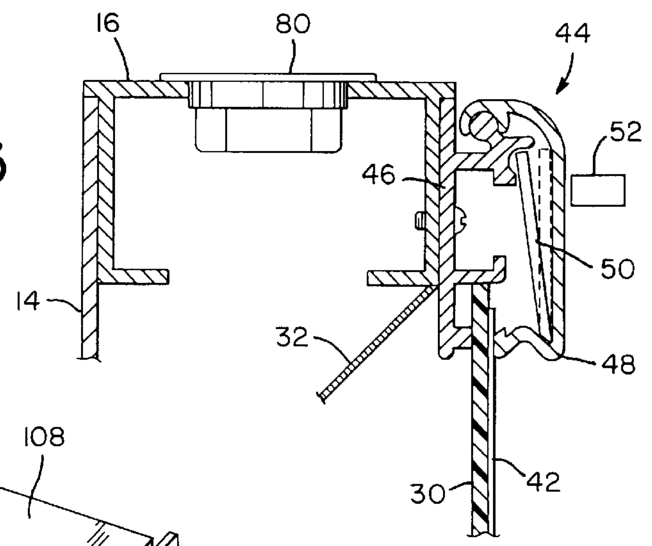
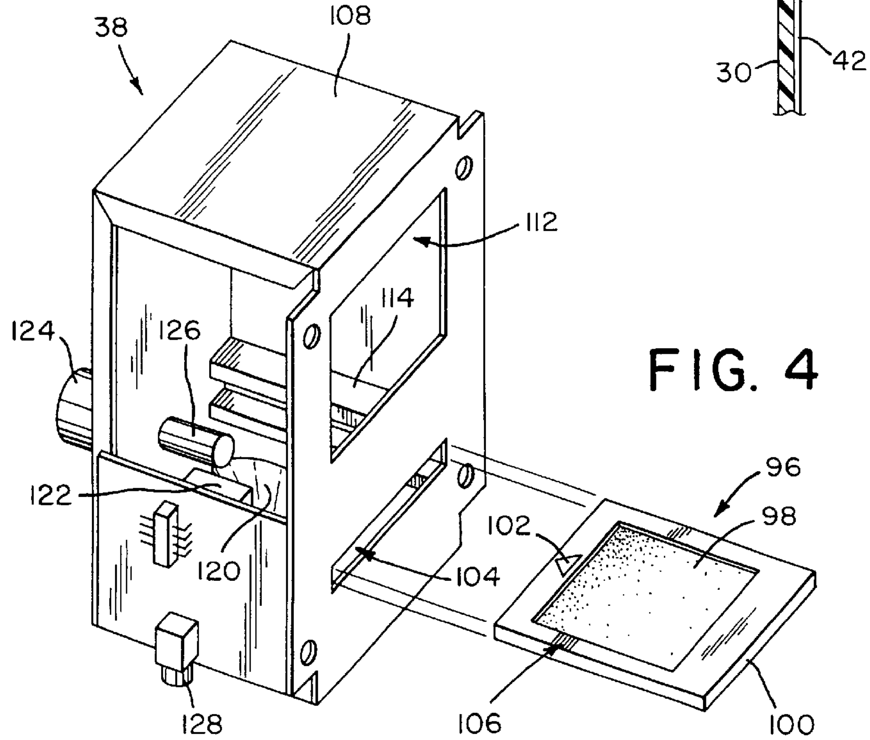
FIG. 4
FIG. 5
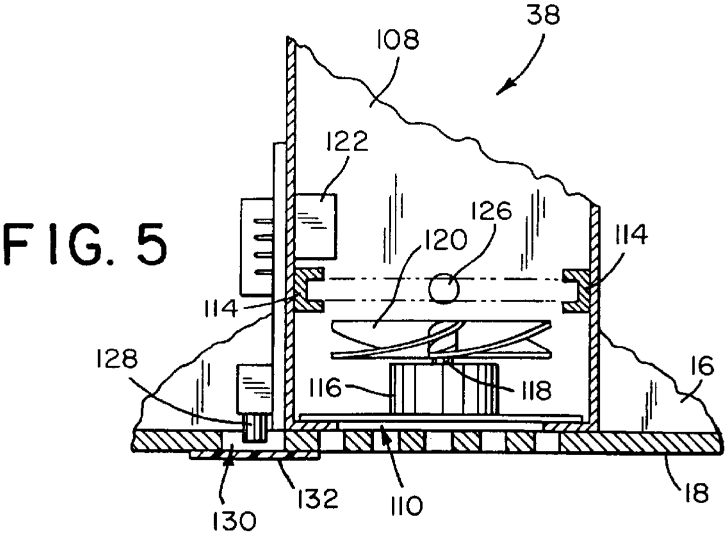

DISPLAY APPARATUS

FIELD OF THE INVENTION

The present invention relates generally to card, picture or sign exhibiting and, more particularly, to light boxes provided with special effects.

BACKGROUND OF THE INVENTION

Stress must be considered in treating bodily injuries and illnesses. If severe enough or left untreated long enough, stress can produce shock, coma or even death. At a minimum, stress fatigues an individual with its accompanying increases in pain, blood pressure, respiration rate and pulse rate that prolong healing times. Not surprisingly, stress has also been connected to depression and non-compliance with medical directives among the seriously ill.

An individual's environment can have an effect upon how well he copes with stress. Soothing environments have been shown to reduce stress and its negative effects whereas barren environments yield an opposite result. Lush gardens and tropical beaches, for example, have been found by many to be soothing. Thus, many healthcare providers have considered offering attractive gardens and window views that frame verdant scenes to individuals under their care in an effort to promote good health and well-being.

Unfortunately, hospitals, clinics, doctors' offices and other healthcare facilities have, over the years, been built with a focus upon efficiency rather than patient well-being. Thus, one often finds pedestrian architecture with minimal glazing and landscaping in such facilities. While a new window overlooking a garden in a treatment area can have a significant effect upon the healing of an individual, adding a window and landscaping can cost thousands of dollars. So, to provide a soothing environment in the traditional sense can involve significant expenditures.

Healthcare providers have sought to limit expenses in remodeling their facilities and have taken alternative steps to provide a soothing, or at least distracting, environment for sick individuals under their care. In this regard, some have offered television sets in treatment and visitor areas. Others have displayed artworks on walls and have broadcast music from intercom systems. Still other healthcare providers have proposed displaying landscape murals in treatment areas accompanied by the sounds and smells of nature put out by separate aroma and music producing devices. Being cumbersome to set up and use, these latter systems have not seen widespread commercial acceptance.

SUMMARY OF THE INVENTION

In light of the problems associated with the known methods and products for providing relief from environmental and physiological stress, anxiety and pain in healthcare facilities, it is a principal object of the invention to provide a display apparatus offering a realistic, virtual environment that can be readily sensed through the observer's eyes, nose and ears. The apparatus can, thus, accurately replicate the visual, auditory and olfactory experiences that one might encounter through an open window overlooking forests, mountains or beaches. In a healthcare facility, such experiences can be soothing and distracting to an observer undergoing diagnostic or treatment procedures thereby reducing stress, anxiety, pain, depression and need for medications. Recovery times for sick individuals may ultimately be decreased through use of the apparatus.

It is another object of the present invention to provide an apparatus of the type described that automatically coordinates its visual, auditory and olfactory emanations so that the virtual environment produced is thoroughly convincing and can be repeatedly produced if desired. Inserting a special display piece carrying an image of woodlands, for instance, into the apparatus will cause the apparatus to illuminate the display piece from behind and produce accompanying sounds of rustling leaves and the smell of cedar. Of course, there is no limit to the types of environments that can be replicated by the apparatus.

It is another object of the invention to provide a display apparatus that, after initial set up, is tamper-resistant. The apparatus is constructed so that neither a display piece bearing a visual image nor a cartridge bearing an aromatic substances nor a digital audio file with reproducible sounds can be removed or changed by unauthorized individuals. Thus, the display apparatus of the present invention can be used in both public and private spaces.

It is a further object of the invention to provide an apparatus of the type described that can be controlled remotely. In this manner, an invalid user can regulate the illumination, sound and aroma production of apparatus from a distant location and, perhaps, a chair or bed. It is believed that by giving an invalid user some control over his surroundings, of which the apparatus is a part, he becomes an active participant in his recovery. This participation can lead to improved emotional well-being and decreased stress. Moreover, by decreasing stress, the amount of attention required by the individual may be reduced thereby increasing the productivity of healthcare providers.

Another object of the invention is to provide a display apparatus that is easy to install, set up and use. In healthcare facilities, the apparatus provides a safe, non-pharmacological alternative to invasive forms of treatment for reducing stress and promoting rapid healing. Use of the apparatus provides environmental enhancement without costly building and landscape renovations to provide enhanced views. Funds earmarked for renovations can be redirected toward increases in staff or other upgrades. Avoiding renovations also permits healthcare facilities to provide uninterrupted service while environmental enhancements, i.e., installing display apparatus of the present invention, are being made.

It is a further object of the invention to provide a display apparatus of the type described that can be used virtually anywhere. The apparatus can, therefore, be deployed in: healthcare facilities, retail stores, office buildings, warehouses, hotels, solons, spas, resorts, health clubs and homes. In healthcare facilities alone, the apparatus can be placed in waiting rooms, examination and treatment rooms, windowless interior offices, and convalescent areas.

It is an object of the invention to provide improved elements and arrangements thereof in a display apparatus for the purposes described which is portable, lightweight in construction, inexpensive to manufacture, and dependable in use.

Briefly, the display apparatus in accordance with this invention achieves the intended objects by featuring a light box and a display piece removably positioned upon, and illuminated by, the light box. The display piece carries an electronic tag from which an electronic tag reader positioned within the light box obtains information. Also in the light box are a digital audio player for producing audible sounds and an aroma diffuser for entraining an aromatic substance in air. An aroma-bearing cartridge matched with the display piece that may be removably positioned within the diffuser initially carries the aromatic substance. The cartridge has a bar code from which a bar code reader positioned within the diffuser obtains information. A central processing unit in the light box selectively energizes the digital audio player and the aroma diffuser in response to information obtained from the electronic tag and the bar code.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 3 is a lateral cross-sectional view of a frame section of the apparatus.

FIG. 4 is a perspective view of the aroma diffuser of the display apparatus.

FIG. 5 is a partial, lateral cross-sectional view of the bottom of the aroma diffuser of FIG. 4.

Similar reference characters denote corresponding features consistently throughout the accompanying drawings.

DETAILED DESCRIPTION OF THE PREFERRED EMBODIMENT

Figure 1:
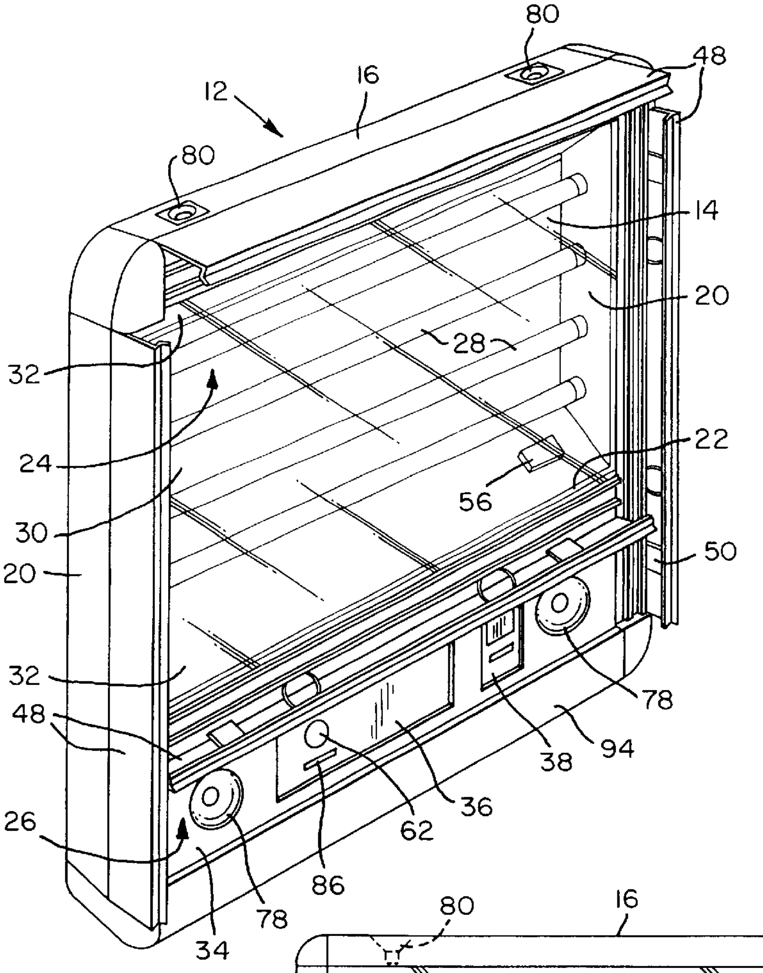
FIG. 1 is a prospective view of the light box portion of a display apparatus in accordance with the present invention shown with its frame sections in an open orientation for receiving a display piece.
Figure 2:
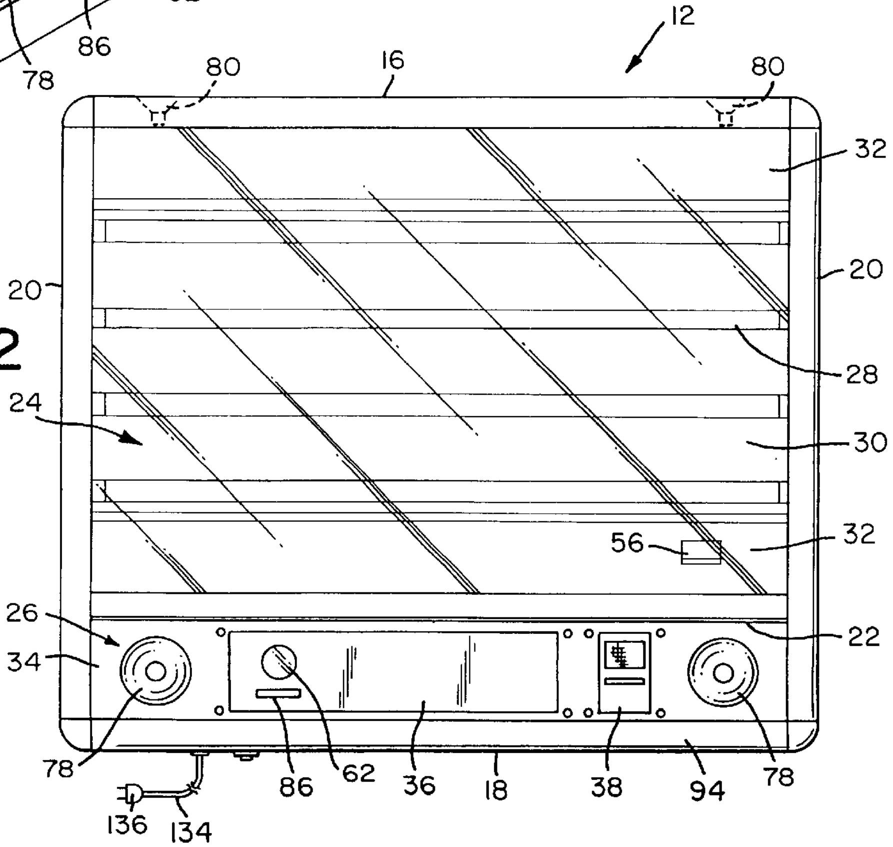
FIG. 2 is a front view of the light box of FIG. 1 with its frame sections in a closed orientation.
Figure 6:
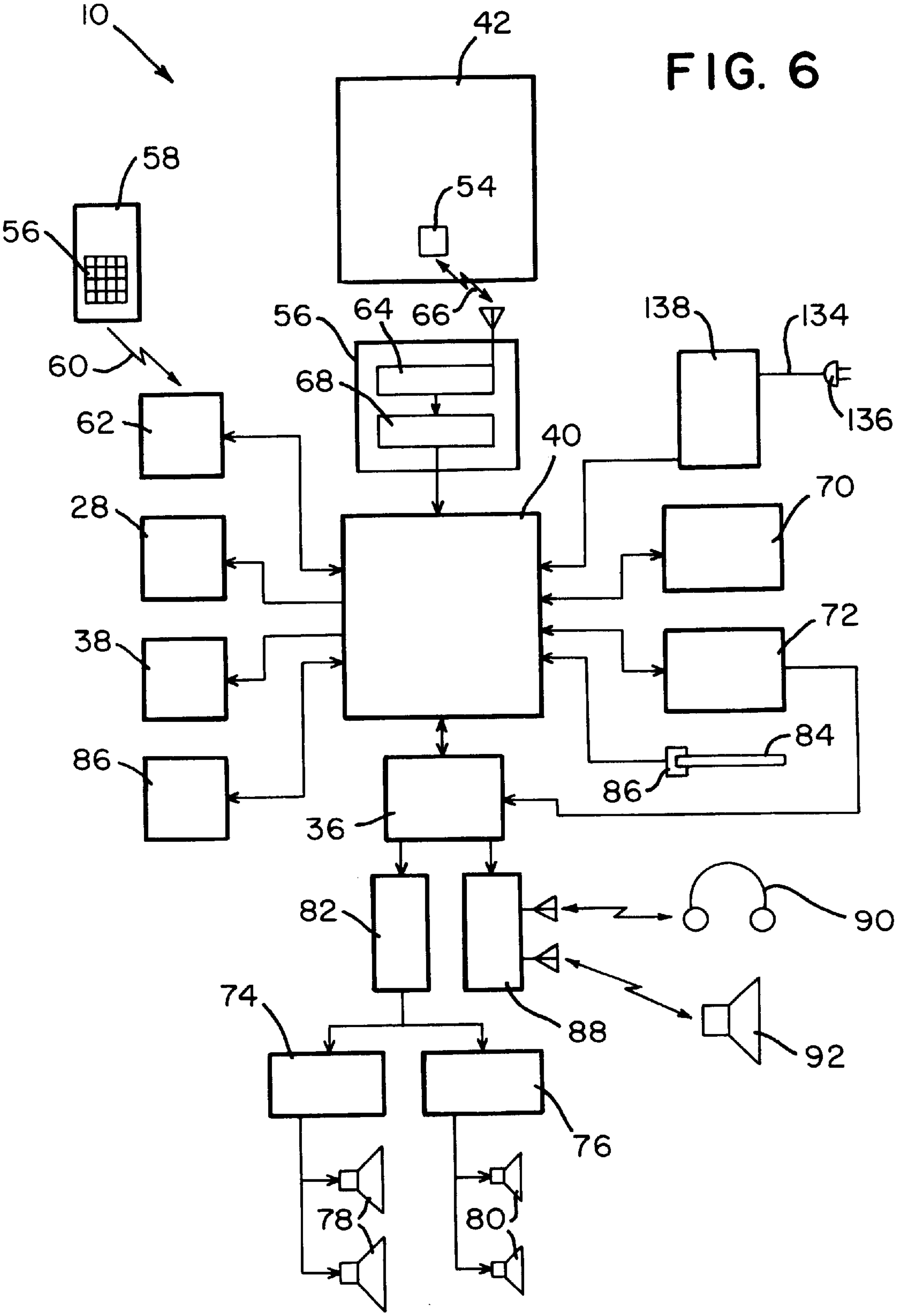
FIG. 6 is an electrical block diagram of the display apparatus.

Referring now to the FIGS., a display apparatus in accordance with the present invention is shown at 10. Apparatus 10 includes a light box 12 defined by a rectangular back wall 14 from the periphery of which top, bottom and opposed side walls 16, 18 and 20 extend forwardly. Running between side walls 20 at a set distance above bottom wall 18 is a medial wall 22 that divides light box 12 into upper and lower compartments 24 and 26. Within upper compartment 24, a number of fluorescent light bulbs 28 are mounted behind a translucent Plexiglas shield 30 that closes the front of upper compartment 24. Angled reflectors 32 adjacent the top and medial walls 16 and 22 direct light produced by bulbs 28 through shield 30. Lower compartment 26, however, is closed by a cover plate 34 behind which are positioned a digital audio player 36, an aroma diffuser 38 and a central processing unit (CPU) 40 for producing a virtual environment 1 when a display piece 42 is secured atop shield 30.

CPU 40 is a microprocessor that handles many of the processing and controlling operations of apparatus 10. In addition to embedded firmware, software codes stored in onboard memory in CPU 40 provide the framework for operating apparatus 10.

A holder of the type described in U.S. Pat. No. 5,608,980, issued to Gary D. Pangerel on Mar. 11, 1997, and incorporated for all purposes herein, is employed to releasably secure display piece 42 atop shield 30. Briefly, the holder includes a number of lockable frame sections 44 having back members 46 each being disposed atop a respective one of the top, medial and side walls 16, 18 and 20. Attached to each back member 46 is a front member 48 that can be pivoted outwardly to open a frame section 44 for selective insertion or removal of shield 30 and overlaying display piece 42. A magnetic tab 50 is positioned behind each front member 48 and is biased to prevent front member 48 from being opened in the absence of an external magnetic field. To open a frame section 44, a user slides a magnet 52 along front member 48 until attraction is felt between magnet 52 and tab 50. Magnet 52, then, releases tab 50 and allows front member 48 to swing open. Since tab 50 is not visible from the exterior of light box 12, a display piece 42 dimensioned like shield 30 can be inserted into light box 12 without fear of later tampering.

Display piece 42 is a sheet of paper, cardboard, plastic, glass or cloth upon which is printed a high-resolution, landscape photograph or other image that appeals to a user thereby inducing relaxation and reducing stress. Images of this type may include views of streams, lakes, shorelines, forests, and mountains. The sheet is preferably formed such that it is light-transmissive so that bulbs 28 will illuminate such from behind when display piece 42 is positioned atop shield 30 and bulbs 28 are energized. For example, the Eastman Kodak Company produces a translucent material upon which digital images can be printed that it markets under the mark Duratrans®. This material is typically used for producing large transparencies used as backlit displays in light boxes and can be used to make display piece 42.

A radio frequency identification (RFID) tag 54 is attached to display piece 42. Tag 54 communicates with a tag reader 56 in upper compartment 24 of light box 12 to convey an identification number to CPU 40. CPU 40 uses this number to examine records stored within itself to identify the visible image carried by display piece 42 and to control audio player 36 and aroma diffuser 38. Preferably, tag 54 is resistant to shocks, moisture and dirt. Further, it is preferred that tag 54 be small, flat and unobtrusive when attached to display piece 42. Numerous, examples of RFID tags possessing such characteristics are commercially available from Phillips Semiconductors and others; but, by way of example, tag 54 can be constructed as described in U.S. Pat. No. 6,107,920, issued to Noel H. Eberhardt et al., on Aug. 22, 2000. The '920 patent is hereby incorporated by reference into the disclosure of the present invention.

Briefly, the '920 patent describes a tag possessing a read only memory for data storage and an antenna for broadcasting stored data. The tag is powered and read by inductive coupling. Inductive coupling utilizes a coil element that is energized by a coded RF signal from a tag reader to provide power to the tag circuitry. The tag coil modulates and reflects the incident RF carrier signal back to the tag reader to transfer stored data from the tag to the tag reader, which receives and decodes the data. Read ranges for inductively coupled devices like this are generally on the order of several centimeters.

Manipulating keyboard 56 of a hand-held transmitter 58 causes the broadcast of an infrared wireless signal 60 to a receiver 62 coupled with CPU 40 to energize apparatus 10. CPU 40, in receiving the "on" command from receiver 62, sends a signal to tag reader 56 that directs transceiver 64 of tag reader 56 to broadcast a coded radio frequency (RF) signal 66 to tag 54. Tag 54 correspondingly modulates the frequency of RF signal 66 providing transceiver 62 with the identification (ID) number of display piece 42. This signal is "decoded" by the decoder 68 of tag reader 56 into a number that is, then, delivered to CPU 40 in a conventional binary format.

CPU 40 examines its internal memory to determine whether the ID number obtained from tag 54 is stored there.

If yes, CPU 40 matches the ID number obtained from tag 54 with a previously stored, digital audio file address and commands the audio file located on a hard disk drive 70 in compartment 26 having that address to be downloaded to dynamic memory 72. If, however, CPU 40 does not find a match between the ID number and data in its internal memory, CPU 40 will require additional input from transmitter 58 to download an audio file from hard drive 70 into dynamic memory 72.

Either of two modes of operation for apparatus 10 can be selected by manipulating keyboard 56 of transmitter 58 that, in response, broadcasts an infrared signal to receiver 62 that is conveyed to CPU 40. The signal can designate either an "auto start" or a "selective start" mode. In "auto start," CPU 40 energizes apparatus 10 and causes tag reader 56 to interrogate tag 54. Upon receiving a recognized ID number from tag reader 56, CPU 40 commands audio player 36 to decode an audio file in dynamic memory 72 and provide a pair of signal amplifiers 74 and 76 and, then, a plurality of audio speakers 78 and 80 with electrical signals that are transduced into audible sounds. In "selective start" mode, however, CPU 40 commands audio player 36 to decode an audio file selected from hard drive 70 only after depressing a "play" key (not shown) in keyboard 56 of transmitter 58 which broadcasts this action to receiver 62 and CPU 40. Audio player 36 may, by means of transmitter 58 signaling CPU 40 in a conventional manner, also, be caused to pause its playback of the audio file, select the audio file to be played from storage of hard drive 70, stop playback, conduct continuous playback of the file until commanded to pause or stop thus deenergizing audio player 36. Moreover, transmitter 58 may be used selectively to: energize bulbs 28, energize aroma diffuser 38, or direct the operation of a dual-channel stereo balance and fader control 82 to adjust the volume of sound emitted by speakers 78 and 80.

Digital audio player 36 is preferably an MP3 player of conventional construction although such may, with appropriate modification to apparatus 10, also be a compact disc player, cassette tape player, DVD player or any other audio or sound-producing device with a controlled interface. MP3 players, however, permit the use of a digital storage device such as a "smart card" 84 and a compatible card reader 86 for the rapid input of digital audio files into hard disc drive 70 for subsequent playback. By connecting a modem 86 to CPU 40, MP3-type digital audio files can be readily downloaded from the Internet onto hard disc drive 36 for playback by preferred audio player 36.

Speakers 78 and 80 are of two types for optimum sound reproduction. Speakers 78 are of full range-type and are mounted upon opposite ends of cover plate 34. Speakers 80, however, are high-frequency "tweeters" mounted at opposite ends of top wall 16 behind upper reflector 32.

Speakers 78 and 80 are wired directly to audio player 36 to produce stereophonic sound. If desired, an RF transmitter 88 can be connected to audio player 36 so as to permit the use of a remote, wireless headset 90 and wireless subwoofer or surround sound speakers 92 with apparatus 10.

Cover plate 34 is provided with suitable openings at its opposite ends through which sound from speakers 78 can freely pass. Between speakers 78 are cutouts through which audio player 36 and aroma diffuser 38 can be accessed. Cover plate 34 is secured at its top to light box 12 by threaded fasteners (not shown) penetrating medial wall 22. Cover plate 34 is, however, secured at its bottom to light box 12 by a locking frame section 94 on bottom wall 18 identical to frame sections 44.

An aroma-bearing cartridge 96 is utilized with apparatus 10 and includes a porous and air-permeable pad 98 formed of a dense mat of natural or synthetic fibers to which has been applied one or more essential or botanical oils or other aromatic substances capable of being entrained in air and providing a scent. The aromatic substances may be distilled extracts of leaves, flowers, branches, barks, roots, fungi or like natural or synthetic compounds. A rigid frame 100 surrounds and reinforces pad 98. Indicia are provided on frame 100 in the form of an arrow 102 indicating the direction of insertion of cartridge 96 into slot 104 in aroma diffuser 38 and a machine-readable tag or bar code 106.

Bar code 106 is a series of varying width, vertical bars and spaces representative of a number. CPU 40 uses this number to look up internally stored records that identify the oils or aromatic substances carried by pad 98. Once identified, CPU 40 can determine whether to energize diffuser 38 or not as will be detailed below.

Cartridge 96 will, prior to use, be contained within an impermeable pouch (not shown) to limit the evaporation of aromatic substances from pad 98. Once the pouch is opened, cartridge 96 is inserted into aroma diffuser 38 where the aromatic substances on pad 98 are entrained in air in a controlled manner. Pouch will, of course, be suitably labeled to identify its correspondence with display piece 42. Thus, the general scent of cedar, among other relevant scents, may, for example, be associated with a display piece 42 bearing the image of woodlands whereas the general scent of roses, among other relevant scents, may be associated with a garden image. These correspondences would be stored in the onboard memory of CPU 40 prior to the use of apparatus 10.

Aroma diffuser 38 includes a hollow, box-like housing 108 having an inlet opening 110 in its bottom and an outlet opening 112 in its front. A slot 104 is provided in the front of housing 108 below outlet opening 112 for snugly receiving cartridge 96. C-shaped guide rails 114 extend inwardly from slot 104 along the opposite sides of housing 108 to grasp frame 100 and maintain cartridge 96 in a fixed, horizontal position between inlet opening 110 and outlet opening 112. For drawing air into inlet opening 110 through pad 98 and forcing such from outlet opening 112, an electric motor 116 having a rotatable drive shaft 118 carrying a fan blade 120 is mounted within housing 108 beneath guide rails 114. CPU 40 can vary the voltage applied to motor 116 so that the speed at which shaft 118 and blade 120 are rotated can be changed to control the flow of air through pad 98 and the rate at which aromatic substances are emitted by diffuser 38.

A duct (not shown) may be utilized within housing 108. The duct would direct airflow to minimize pressure losses and isolate electrical components from continued exposure dust, dirt and aromatic substances. Such a duct may be a tube with suitable openings for admission of, cartridge 96 and fan blade 120 and would connect inlet and outlet openings 110 and 112 together.

A tag or bar code reader 122 having a conventional scanner and decoder (neither shown) is secured within housing 108 above one of the guide rails 114, a portion of which having been cut away so as to provide a direct line of sight between reader 122 and bar code 106 on cartridge 96. In use, light from the scanner is directed onto bar code 106 with the light being absorbed by the bars and reflected by the intervening spaces. A photocell in the scanner receives the reflected light and converts such into electrical signals. In response, the photocell generates a low electrical signal for the spaces and a high electrical signal for the bars with the duration of the electrical signal reflecting the varying widths of the spaces and bars. These signals are "decoded" by the decoder into a number that is, then, delivered to CPU 40 in a conventional binary format.

CPU 40 energizes diffuser 38 based upon the number interpreted from bar code 106. For example, CPU 40 permits electrical current to flow to motor 116 so as to impel air through diffuser 38 and cartridge 96 if the number corresponds with another one that is stored in memory within CPU 40 representative of display piece 42. The decoded number may also be used by CPU 40 to cycle motor 116 on and off and to control its speed since some concentrated oils require minimal air circulation to be detectable in air whereas other less-concentrated oils require extended fan run times at higher speeds. If no correspondence between the decoded bar code number and the stored number is obtained, no current is provided to motor 116 by CPU 40; but, CPU 40 will deliver an electrical current to an ejector solenoid 124 to energize such and eject cartridge 96 from slot 104.

Ejector solenoid 124 is secured to the rear of housing 108 and has a piston 126 that may be selectively extended toward slot 104 between guide rails 114. Upon full manual insertion of cartridge 96 into slot 104, piston 126 is forced by the front of cartridge frame 100 from housing 108 and into solenoid 124. Providing an electrical current to solenoid 124, however, causes piston 126 to return to its original, extended position between rails 114 thereby ejecting cartridge 96 outwardly from housing 108 through slot 104.

Removal of cartridge 96 from housing 108 is accomplished only by the action of solenoid 124 since no portion of cartridge 94 protrudes from slot 104 when such is fully positioned therein to prevent tampering. Nonetheless, a user can selectively energize solenoid 124 to eject cartridge 96 from diffuser 38 in one of two ways. First, he may press a momentary micro-switch button 128 extending from housing 108 and accessible through an opening 130 in bottom wall 18 of light box 12. A flexible, Mylar disk 132 "hides" opening 130. Additionally, a user may press an eject button in keyboard 56 of transmitter 58 that causes CPU 40 to deliver an energizing current to solenoid 124.

Electrical power is supplied to all components of apparatus (except hand-held transmitters 58 having an on-board battery) through a cable 134 having a plug 136 for connection to a conventional wall outlet. Cable 134 provides electrical power to a power supply 138 preferably carried within lower compartment 26 of light box 12. Power supply 138 is of conventional construction with voltage reduction and regulation capabilities.

Normal use of apparatus 10 is straightforward. First, light box 12 is mounted in the usual manner on a wall or other support and plug 136 is engaged with an outlet to supply electricity to light box 12 and illuminate bulbs 28. Next, display piece 42, perhaps selected from a group of fifteen display pieces with different images and different encoded information on their tags 54, is pressed against shield 30. A transparent cover sheet (not shown), formed of plastic or glass and having substantially the same dimensions as display piece 42, is positioned over display piece 42. Then, display piece 42 and the transparent cover sheet are locked in place in light box 12 by means of frame sections 44 engaging the periphery of display piece 42. An aroma-bearing cartridge 96 corresponding with display piece 42 is, then, inserted into slot 104. CPU 40, now, automatically compares data derived from tag 54 on display piece 42 with that obtained from bar code 106 on cartridge 96. If correspondence is found in onboard memory, CPU 40 directs an electrical current to motor 116 thereby causing apparatus 10 to emit an aromatic substance. If CPU 40 finds no correspondence, motor 116 will remain deenergized and cartridge 96 will be automatically ejected from slot 104. Simultaneously, in either case, CPU 40 will deliver an audio file from hard drive 70 to dynamic memory 72 and cause electrical current to flow to audio player 36 and its associated sound-producing features to cause sounds corresponding to the image observed on display piece 42 to be broadcast from apparatus 10.

The automatic functions of apparatus 10 can be augmented and overridden, to an extent, by user inputs into keyboard 56 on hand-held transmitter 58. As examples, the volume of sound coming from speakers 78 and 80 can be adjusted and an audio file other than the one selected by CPU 40, but found to be soothing by a user, can be downloaded to dynamic memory 72 and played by audio player 36. Furthermore, the speed of motor 116 in aroma diffuser 38 can be varied to adjust the emissions of an aromatic substance from diffuser 38 in response to variations in room size and ventilation rate.

Apparatus 10 automatically coordinates and integrates its visual, auditory and olfactory emanations so that the virtual environment produced is thoroughly convincing. Nonetheless, a user can modify these emanations to best suit his desires. In a healthcare setting, the emanations, however generated, can be soothing and distracting to the point where stress, anxiety, pain, depression and need for medications may be reduced.

While the invention has been described with a high degree of particularity, it will be appreciated by those skilled in the art that modifications may be made thereto. For example, an edge-lit light box could be substituted for light box 12 of backlit design. Therefore, it is to be understood that the present invention is not limited to the sole embodiment described above, but encompasses any and all embodiments within the scope of the following claims.

We claim:

1. A display apparatus, comprising:

a light box upon which a display piece can be removably positioned and illuminated by said light box, said display piece bearing a first machine-readable tag;

a first tag reader in said light box for obtaining information from said first machine-readable tag;

a digital audio player in said light box connected to at least one speaker for producing audible sounds;

an aroma diffuser in said light box for entraining an aromatic substance in air; and, a central processing unit in said light box for selectively energizing said digital audio player and said aroma diffuser in response to information obtained from said first machine-readable tag by said first tag reader.

2. The display apparatus according to claim 1 further comprising a display piece being a sheet of light transmissive material bearing a visible image and said first machine-readable tag.

3. The display apparatus according to claim 2 wherein said first machine-readable tag is a radio frequency identification tag.

4. The display apparatus according to claim 3 wherein said first tag reader includes:

a transceiver for broadcasting a radio frequency signal to said first machine-readable tag and receiving a modulated radio frequency signal from said first machine-readable tag; and, a decoder coupled with said transceiver for converting said modulated radio frequency signal into information for delivery to said central processing unit.

5. The display apparatus according to claim 1 wherein said digital audio player is an MPEG layer-3 player.

6. The display apparatus according to claim 1 wherein said aroma diffuser includes:

a housing having: an inlet opening, an outlet opening remote from said inlet opening, and a slot between said inlet opening and said outlet opening;

a pair of guide rails positioned within said housing and extending rearwardly from said a pair slot between said inlet opening and said outlet opening;

an aroma-bearing cartridge for removable positioning upon said guide rails, said cartridge having:

a porous and air-permeable pad to which has been applied an aromatic substance capable of being entrained in air; and, a rigid frame surrounding and reinforcing said pad; and, a fan positioned between said inlet opening and said outlet opening for impelling air into said inlet opening, through said pad and from said outlet opening when energized by said central processing unit.

7. The display apparatus according to claim 6 wherein said frame of said aroma-bearing cartridge has a second machine-readable tag and said aroma diffuser further includes a second tag reader in said housing for obtaining information from said second machine-readable tag and delivering such information to said central processing unit whereby said central processing unit will energize said fan when said central processing unit finds a correspondence between said information obtained from said first machine-readable tag and said information obtained from said second machine readable tag.

8. The display apparatus according to claim 7 wherein said second machine-readable tag is a bar code and said second tag reader is a bar code reader.

9. A display apparatus, comprising:

a light box;

a display piece, having a first machine-readable tag, removably positioned upon, and illuminated by, said light box;

a first tag reader in said light box for obtaining information from said first machine-readable tag;

a digital audio player in said light box connected to at least one speaker for producing audible sounds;

an aroma diffuser in said light box for entraining an aromatic substance in air;

an aroma-bearing cartridge, carrying an aromatic substance, removably positioned within said aroma diffuser and having a second machine-readable tag;

a second tag reader in said aroma diffuser for obtaining information from said second machine-readable tag; and, a central processing unit in said light box for selectively energizing said digital audio player and said aroma diffuser in response to information obtained from said first machine-readable tag by said first tag reader and from said second machine-readable tag by said second tag reader.

10. The display apparatus according to claim 9 wherein said light box includes a plurality of lockable frame sections for engaging the periphery of said display piece and preventing unauthorized tampering thereof.

11. The display apparatus according to claim 9 wherein said first machine-readable tag is a radio frequency identification tag.

12. The display apparatus according to claim 11 wherein said first tag reader includes:

a transceiver for broadcasting a radio frequency signal to said first machine-readable tag and receiving a modulated radio frequency signal from said first machine-readable tag; and, a decoder coupled with said transceiver for converting said modulated radio frequency signal into information for delivery to said central processing unit.

13. The display apparatus according to claim 9 wherein said digital audio player is an MPEG layer-3 player.

14. The display apparatus according to claim 13 wherein said aroma diffuser includes:

a housing having: an inlet opening, an outlet opening remote from said inlet opening, and a slot between said inlet opening and said outlet opening;

a pair of guide rails positioned within said housing and extending rearwardly from said slot between said inlet opening and said outlet opening;

an aroma-bearing cartridge for removable positioning upon said guide rails, said cartridge having:

a porous and air-permeable pad to which has been applied an aromatic substance capable of being entrained in air; and, a rigid frame surrounding and reinforcing said pad;

a solenoid secured to said housing and having a piston that may be extended between said guide rails to eject said cartridge from said housing; and, a fan positioned between said inlet opening and said outlet opening for impelling air into said inlet opening, through said pad and from said outlet opening when energized by said central processing unit.

15. The display apparatus according to claim 9 wherein said second machine-readable tag is a bar code and said second tag reader is a bar code reader.

16. A display apparatus, comprising:

means for producing light from an electric current;

a display piece, having a first machine-readable tag, removably positioned upon, and illuminated by, said light-producing means;

means for obtaining information from said first machine-readable tag;

means for producing audible sounds carried by said light-producing means;

means for entraining an aromatic substance in air carried by said light-producing means;

an aroma-bearing cartridge, carrying an aromatic substance, removably positioned within said aroma diffuser and having a second machine-readable tag;

means for obtaining information from said second machine-readable tag; and, means for selectively energizing said digital audio player and said aroma diffuser in response to information obtained from said first machine-readable tag and from said second machine-readable tag.

17. The display apparatus according to claim 16 wherein said first machine-readable tag is a radio frequency identification tag and said means for obtaining information from said first machine-readable tag includes:

a transceiver for broadcasting a radio frequency signal to said first machine-readable tag and receiving a modulated radio frequency signal from said first machine-readable tag; and, a decoder coupled with said transceiver for converting said modulated radio frequency signal into information for delivery to said central processing unit.

18. The display apparatus according to claim 16 wherein said second machine-readable tag is a bar code and said means for obtaining information from said second machine-readable tag is a bar code reader.

19. The display apparatus according to claim 16 wherein said light box includes a plurality of lockable frame sections for engaging the periphery of said display piece and preventing unauthorized tampering thereof.

* * * * *